(12) United States Patent
Belzons (10) Patent No.: US 11,207,942 B2
(45) Date of Patent: Dec. 28, 2021

(54) USER-ACTUATED AIR NOZZLE CONTROL MECHANISM AND METHOD FOR CONTROLLING THE AIRFLOW

(71) Applicant: Ningbo Geely Automobile Research & Development Co., Ltd., Zhejiang (CN)

(72) Inventor: Lionel Belzons, Nödinge (SE)

(73) Assignee: NINGBO GEELY AUTOMOBILE RESEARCH & DEVELOPMENT CO., Ningbo (CN)

(*) Notice: Subject to any disclaimer, the term of this patent is extended or adjusted under 35 U.S.C. 154(b) by 214 days.

(21) Appl. No.: 16/550,193

(22) Filed: Aug. 24, 2019

(65) Prior Publication Data

US 2019/0375266 A1    Dec. 12, 2019

Related U.S. Application Data

(63) Continuation of application No. PCT/CN2018/077048, filed on Feb. 23, 2018.

(30) Foreign Application Priority Data

Mar. 1, 2017   (EP) ..................................... 17158681

(51) Int. Cl.
*B60H 1/34* (2006.01)
*B60H 1/00* (2006.01)

(52) U.S. Cl.
CPC ......... *B60H 1/0065* (2013.01); *B60H 1/3414* (2013.01); *B60H 2001/3478* (2013.01)

(58) Field of Classification Search
CPC .............. B60H 1/0065; B60H 1/00692; B60H 1/00857; B60H 1/3421; B60H 2001/3478; F24F 13/08; F24F 13/10; F24F 13/1426

(Continued)

(56) References Cited

U.S. PATENT DOCUMENTS 3,403,574 A * 10/1968 De Castelet De Coye ................. F16C 1/10 74/471 R
3,847,210 A * 11/1974 Wells ................... F24F 13/1426 165/103

(Continued)

FOREIGN PATENT DOCUMENTS

CN   102892602 A   1/2013
CN   102892612 A   1/2013

(Continued)

OTHER PUBLICATIONS

Machine Translation of Bouldron (Year: 2010).*

(Continued)

*Primary Examiner* — Steven B Mcallister
*Assistant Examiner* — Mark P Yost
(74) *Attorney, Agent, or Firm* — Tucker Ellis LLP (57) ABSTRACT

A user-actuated control mechanism that controls airflow to an air nozzle device in a vehicle includes a push button, an actuating mechanism, and a flow control valve. The button, in a first actuating sequence, translates from an initial position to an end position and back to the initial position, so that the mechanical actuating mechanism displaces the control valve from an open position to a closed position. In a second actuating sequence, the button translates from the initial position to the end position and back to the initial position, so that the mechanical actuating mechanism displaces the flow control valve from the closed position to the open position. The valve is displaced in both sequences when the button is translated from the initial position to the end position, or is displaced in both sequences when the button is translated from the end position to the initial position.

13 Claims, 8 Drawing Sheets

(58) Field of Classification Search
USPC .......................................................... 454/143
See application file for complete search history.

(56) References Cited

U.S. PATENT DOCUMENTS

| | | | | |
|---|---|---|---|---|
| 4,517,422 A | * | 5/1985 | Black, III | ............ H01H 13/568 |
| | | | | 200/5 E |
| 4,653,386 A | * | 3/1987 | Hayakawa | ......... B60H 1/00871 |
| | | | | 454/121 |
| 4,659,880 A | * | 4/1987 | Kondo | ................ B60H 1/0065 |
| | | | | 200/16 C |
| 6,129,627 A | * | 10/2000 | Jankowski | ............. B60H 1/247 |
| | | | | 454/144 |
| 10,144,269 B2 | * | 12/2018 | Zhang | ................ B60H 1/00685 |
| 2019/0375274 A1 | * | 12/2019 | Jonsson | ............... B60K 11/085 |

FOREIGN PATENT DOCUMENTS

| | | | | | |
|---|---|---|---|---|---|
| CN | 106476571 A | * | 3/2017 | ........... | B60H 1/3442 |
| CN | 106965644 A | * | 7/2017 | ........... | B60H 1/3442 |
| CN | 110356189 A | * | 10/2019 | ............... | B60H 1/00 |
| EP | 1 721 766 A1 | | 11/2006 | | |
| FR | 2933639 A1 | * | 7/2008 | ........... | B60H 1/3442 |
| FR | 2933639 A1 | | 1/2010 | | |
| FR | 2933639 A1 | * | 1/2010 | ........... | B60H 1/3442 |
| JP | H07180900 A | * | 12/1993 | ............... | B60H 1/34 |
| JP | H07 180900 A | | 7/1995 | | |
| JP | H07 285327 A | | 10/1995 | | |
| JP | H07285327 A | * | 10/1995 | ............... | B60H 1/34 |
| JP | H07285327 A | * | 4/2010 | ............... | B60H 1/34 |
| KR | 101301750 B1 | * | 12/2006 | ......... | B60H 1/00671 |
| KR | 20080054309 A | | 6/2008 | | |
| KR | 20100034526 A | | 4/2010 | | |
| KR | 101301750 B1 | * | 8/2013 | ........... | B60H 1/3442 |
| KR | 101301750 B1 | | 8/2013 | | |
| WO | WO-2011149247 A2 | * | 12/2011 | ............... | B60H 1/34 |
| WO | 2016093660 A1 | | 6/2016 | | |

OTHER PUBLICATIONS

Machine Translation of Hideji (Year: 2010).*
Machine Translation of Kim (Year: 2013).*
Walters, Ronald, "Making The Reciprocating Rack & Pinion", https://www.youtube.com/watch?v=zae2ZePQTwQ (Year: 2014).*
Machine Translation of Toru (Year: 2017).*
Machine Translation of Han (Year: 2017).*
Machine Translation of Lee (Year: 2019).*
European Search Report from corresponding European application No. 17158681.1, dated Aug. 10, 2017, 7 pages.
International Search Report and Written Opinion from corresponding international application No. PCT/CN2018/077048, dated May 31, 2018, 9 pages.

* cited by examiner

USER-ACTUATED AIR NOZZLE CONTROL MECHANISM AND METHOD FOR CONTROLLING THE AIRFLOW

RELATED APPLICATION DATA

This application is a continuation of International Patent Application No. PCT/CN2018/077048, filed Feb. 23, 2018, which claims the benefit of European Patent Application No. 17158681.1, filed Mar. 1, 2017, the disclosures of which are incorporated herein by reference in their entireties.

TECHNICAL FIELD

The present disclosure relates to a user-actuated air nozzle control mechanism for controlling the air flow to an air nozzle device in a vehicle. The air nozzle control mechanism comprises an actuating mechanism that is connected to a flow control valve. The flow control valve is configured to be displaced between an open position where air is flowing to the air nozzle device and a closed position where air is prevented from flowing to the air nozzle device. The disclosure further relates to a method for controlling the air flow to an air nozzle device in a vehicle. Moreover, the disclosure relates to a vehicle comprising a user-actuated air nozzle control mechanism for controlling the air flow to an air nozzle device in the vehicle.

The user-actuated air nozzle control mechanism can be arranged in a dashboard, a door trim, a rear seat console or similar interior structure of a vehicle. In particular, the user-actuated air nozzle control mechanism may be arranged in a dashboard structure adapted to control the discharge and distribution of air for the interior compartment of the vehicle. Although the invention will be described in relation to a car, the invention is not restricted to this particular vehicle, but may as well be installed in other type of vehicles such as minivans, recreational vehicles, off-road vehicles, trucks, buses, boats, airplanes or the like.

BACKGROUND

In the field of air flow control valves and ventilation systems for vehicles, there is an increasing demand for improving the operation and simplifying the handling of the systems. Ventilation systems for vehicles are increasingly complex as the demands on the degree of control of such systems increase. Heating, ventilation and air conditioning (HVAC) systems are typically used to control the environment in a vehicle such that desired interior conditions set by the operator are maintained irrespective of the exterior environment. The vehicle air ventilation system is typically connected to one or several air flow control valves, vents, nozzles or similar components in order to discharge a flow of air within a vehicle compartment through an air nozzle device. In many systems, the ventilation system is connected to the air flow control valve via an air duct, which is controlling the flow of air. The air flow control valve is often installed in a vehicle compartment member such as a dashboard or other interior structure, and thereby defines the interface between the ventilation system and the vehicle compartment.

The air flow control valve may be controlled, depending on the wishes of the driver and the passengers in the vehicle, so that the air flow control valve is displaced between an open position where air is flowing to the air nozzle device and a closed position where air is prevented from flowing to the air nozzle device.

It is common in vehicle applications to have an adjustment member such as a control wheel to control the air flow control valve. The control wheel can adjust the flow control valve in different positions and direct the flow of air. One example of an air nozzle control mechanism with a control wheel is disclosed in EP 1 721 766 A1.

One problem with this type of air nozzle control mechanism with a control wheel is that the mechanism is not always easy to adjust for the driver of the vehicle, which could lead to situations where the driver is not able to pay full attention to the driving of the vehicle, due to lacking haptic feedback of the control wheel. There is also a desire when designing the interior structures of today's vehicles to integrate buttons and other control means in an aesthetically attractive way with minimized surface footprint, in order to achieve minimalistic and less complex structures. This is difficult to accomplish with traditional air control systems with control wheels.

There is thus need for an improved air nozzle control mechanism, which is easy to maneuver and provides haptic feedback to the user, simple to integrate in the interior structure of the vehicle to achieve an aesthetically attractive design, and has a reliable construction.

SUMMARY

An object of the present disclosure is to provide a user-actuated air nozzle control mechanism and a method for controlling the air flow with a user-actuated air nozzle control mechanism, where the previously mentioned problems are avoided. This object is at least partly achieved by the features of the independent claims. The dependent claims contain further developments of the air nozzle control mechanism and the method for controlling the air flow.

The disclosure concerns a user-actuated air nozzle control mechanism for controlling the air flow to an air nozzle device in a vehicle, comprising a push button, a mechanical actuating mechanism connected to the push button, and at least one flow control valve connected to the mechanical actuating mechanism. The at least one flow control valve is configured to be displaced between an open position where air is flowing to the air nozzle device and a closed position where air is prevented from flowing to the air nozzle device. The push button is in a first actuating sequence adapted to be translating from an initial position to an end position and back to the initial position, so that the mechanical actuating mechanism is displacing the at least one flow control valve from the open position to the closed position. The push button is in a second actuating sequence adapted to be translating from the initial position to the end position and back to the initial position, so that the mechanical actuating is displacing the at least one flow control valve from the closed position to the open position. The at least one flow control valve is displaced in the first actuating sequence and in the second actuating sequence when the push button is translating from the initial position to the end position, or the at least one flow control valve is displaced in the first actuating sequence and in the second actuating sequence when the push button is translating from the end position to the initial position. The mechanical actuating mechanism comprises a first actuator connected to the push button, a first pinion connected to the first actuator, a second pinion connected to the first pinion, a second actuator connected to the second pinion, and at least one third pinion attached to the at least one flow control valve, where the at least one third pinion is connected to the second actuator. The translating movement of the push button is transferred into a first linear motion of the first actuator, the first linear motion of the first actuator is transferred into a rotating motion of the first pinion and the second pinion, the rotating motion of the second pinion is transferred into a second linear motion of the second actuator, and the second linear motion of the second actuator is transferred into a rotating motion of the at least one third pinion. Advantages with these features are that the user-actuated air nozzle control mechanism for controlling the air flow to an air nozzle device in a vehicle can be constructed in a fully mechanical and simple way that provides efficient control of the air flow in the vehicle. Depending on the wishes of the driver and the passengers in the vehicle, the actuating sequences make it easy to control the flow of air, so that the air flow control valve is displaced between an open position where air is flowing to the air nozzle device and a closed position where air is prevented from flowing to the air nozzle device. Further, the simple adjustment of the air nozzle control mechanism, which also provides haptic feedback through the actuating sequences, makes it easier for the driver to pay full attention to the driving of the vehicle. It is in this way possible to design the air nozzle control mechanism with a simple, non-powered, and reliable construction, which is cheaper than electrical or electromechanical solutions. By using an integrated push button for the control of air flow, the interior structure of the vehicle can be made in an aesthetically attractive way with minimized surface footprint, in order to achieve a minimalistic and less complex structure. In this way, the design footprint of the integrated push button also is the same both when the air flow control valve is in the open position and in the closed position. The air nozzle control mechanism can thus be made without the use of electric or electromechanical components, which makes the construction simple in design and energy efficient without the need for electric circuits.

According to another aspect of the disclosure, the first actuator comprises a first gear rack engaging the first pinion. In this way the linear motion of the push button and the first actuator is efficiently transferred into a rotary motion of the first and the second pinion. Since the second pinion is connected to the first pinion, the rotational movement of the first pinion will be transferred to the second pinion.

According to a further aspect of the disclosure, the first pinion and the second pinion are rotating in one direction only, wherein the first gear rack is adapted to be disengaged from the first pinion when the push button is translating from the initial position to the end position or when the push button is translating from the end position to the initial position. With this construction, the disengagement of the first gear rack secures that the first pinion and second pinion are rotating in one direction only. It is possible to construct the air nozzle control mechanism so that the first gear rack is disengaged either when the push button is translating from the initial position to the end position, or as an alternative when the push button is translating from the end position to the initial position.

According to an aspect of the disclosure, the first actuator comprises at least two linkage arms and at least one pivoting joint. The arrangement with at least two linkage arms makes it possible to construct the first actuator so the first gear rack can be disengaged in an efficient and reliable way.

According to another aspect of the disclosure, the second actuator comprises a second gear rack and a third gear rack engaging the second pinion, where the third gear rack is oppositely arranged the second gear rack. The rotating motion of the second pinion is transferred into a second linear motion of the second actuator. The second pinion is according to an aspect of the disclosure partially toothed so that the second gear rack and the third gear rack are alternatingly engaged in the first actuating sequence and the second actuating sequence respectively. The partially toothed second pinion can alternatingly engage the second gear rack and the third gear rack, and when the second pinion is engaging the second gear rack, the third gear rack in not engaged, and vice versa.

According to a further aspect of the disclosure, the second actuator comprises at least one fourth gear rack engaging the at least one third pinion, so that the second linear motion of the second actuator is transferred into a rotating motion of the third pinion. The third pinion has a rotating motion in one direction when the at least one flow control valve is displaced from the open position to the closed position and has a rotating motion in an opposite direction when the at least one flow control valve is displaced from the closed position to the open position. The fourth gear rack provides an efficient transfer of the second linear motion to the at least one flow control valve via the third pinion, and in this way the at least one flow control valve is displaced.

According to an aspect of the disclosure, the direction of the first linear motion is arranged at an angle to the direction of the second linear motion. This is an efficient way to establish a compact solution, where linear motions through the use of pinions and gear racks can be arranged at an angle. The angle can be chosen to fit the specific design of the control mechanism. According to a further aspect of the disclosure, the first actuator is connected to a damping unit, which is adapted for dampening the translational movement of the push button. The dampening function makes the push button easy to maneuver and gives a smooth feeling when being actuated. The damping unit may for example be an oil damper. Oil dampers are simple in construction and can be used to efficiently dampen the linear motion of the first actuator. They give a good flexibility when designing of the actuating mechanism.

According to an aspect of the disclosure, the at least one flow control valve is configured to be rotatably displaced between the open position where air is flowing to the air nozzle device and the closed position where air is prevented from flowing to the air nozzle device. This provides an efficient way to control the flow of air. Rotating flow control valves of this type are easy to manufacture and simple in construction.

According to another aspect of the disclosure, the air nozzle device and the push button are integrated in an interior structure of the vehicle, where the air nozzle device comprises one or more air nozzle units. The integration in the interior structure gives an attractive aesthetical appearance of the interior of the vehicle, where the push button can be ergonomically placed within the interior structure. In this way, the interior structure can be made with minimized surface footprint, in order to achieve a minimalistic and less complex structure. The one or more air nozzle units are used to direct air into the interior compartment of the vehicle. The air nozzle units may be arranged in a grid shaped pattern. With this design, the interior structure can be made attractive and also provide an efficient flow of air.

According to an aspect of the disclosure, at least one of the air nozzle units is pivotably arranged within the interior structure so that the air flow out from the at least one pivotably arranged air nozzle unit can be directed in different directions with an air flow directing arrangement. The air flow directing arrangement comprises an air flow directing element pivotably arranged within the interior structure and a connection member connecting the air flow directing element and the at least one pivotably arranged air nozzle unit, so that when adjusting the direction of the air flow directing element the direction of the air flow out from the at least one pivotably arranged air nozzle unit is adjusted. With this construction, the air flow can be easily directed in the desired direction to provide an efficient cooling or heating effect, depending on the needs of the driver or the passengers of the vehicle. Further, the construction provides an easy and efficient control of the direction of the air flow into the interior compartment of the vehicle.

The disclosure further concerns a method for controlling the air flow to an air nozzle device in a vehicle with a user-actuated air nozzle control mechanism, wherein the user-actuated air nozzle control mechanism comprises a push button, a mechanical actuating mechanism connected to the push button, and at least one flow control valve connected to the mechanical actuating mechanism, where the at least one flow control valve is configured to be displaced between an open position where air is flowing to the air nozzle device and a closed position where air is prevented from flowing to the air nozzle device, the method comprising the steps; in a first sequence manually actuating the push button so that it is translating from an initial position to an end position and back to the initial position, so that the mechanical actuating mechanism is displacing the at least one flow control valve from the open position to the closed position; and in a second sequence manually actuating the push button so that it is translating from the initial position to the end position and back to the initial position, wherein the mechanical actuating mechanism is displacing the at least one flow control valve from the closed position to the open position. The at least one flow control valve is displaced in the first sequence and in the second sequence when the push button is translating from the initial position to the end position or the at least one flow control valve is displaced in the first sequence and the second sequence when the push button is translating from the end position to the initial position. Advantages with these features are that the user-actuated air nozzle control mechanism is easy to operate in order to provide efficient control of the air flow in the vehicle. Depending on the wishes of the driver and the passengers in the vehicle, the actuating sequences make it easy to control the flow of air, so that the air flow control valve is displaced between an open position where air is flowing to the air nozzle device and a closed position where air is prevented from flowing to the air nozzle device. Further, the simple adjustment of the air nozzle control mechanism also makes it easier for the driver of the vehicle to pay full attention to the driving of the vehicle, since the push button through the actuating sequences also is providing haptic feedback.

According to an aspect of the disclosure, the mechanical actuating mechanism comprises a first actuator connected to the push button, a first pinion connected to the first actuator, a second pinion connected to the first pinion, a second actuator connected to the second pinion, and at least one third pinion attached to the at least one flow control valve, where the third pinion is connected to the second actuator, wherein the method is further comprising the steps; transferring the translating movement of the push button into a first linear motion of the first actuator; transferring the first linear motion of the first actuator into a rotating motion of the first pinion and the second pinion; transferring the rotating motion of the second pinion into a second linear motion of the second actuator; and transferring the second linear motion of the second actuator into a rotating motion of the at least one third pinion.

According to another aspect of the disclosure, the push button is actuated by manually applying pressure on the push button so that it is translating from the initial position to the end position in a first direction and at the end position releasing the pressure so that the push button translates back to the initial position in a second direction, which is opposite the first direction. In this way, the driver or a passenger can easily operate the push button in a simple way.

BRIEF DESCRIPTION OF DRAWINGS

The disclosure will be described in greater detail in the following, with reference to the attached drawings, in which.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1A:
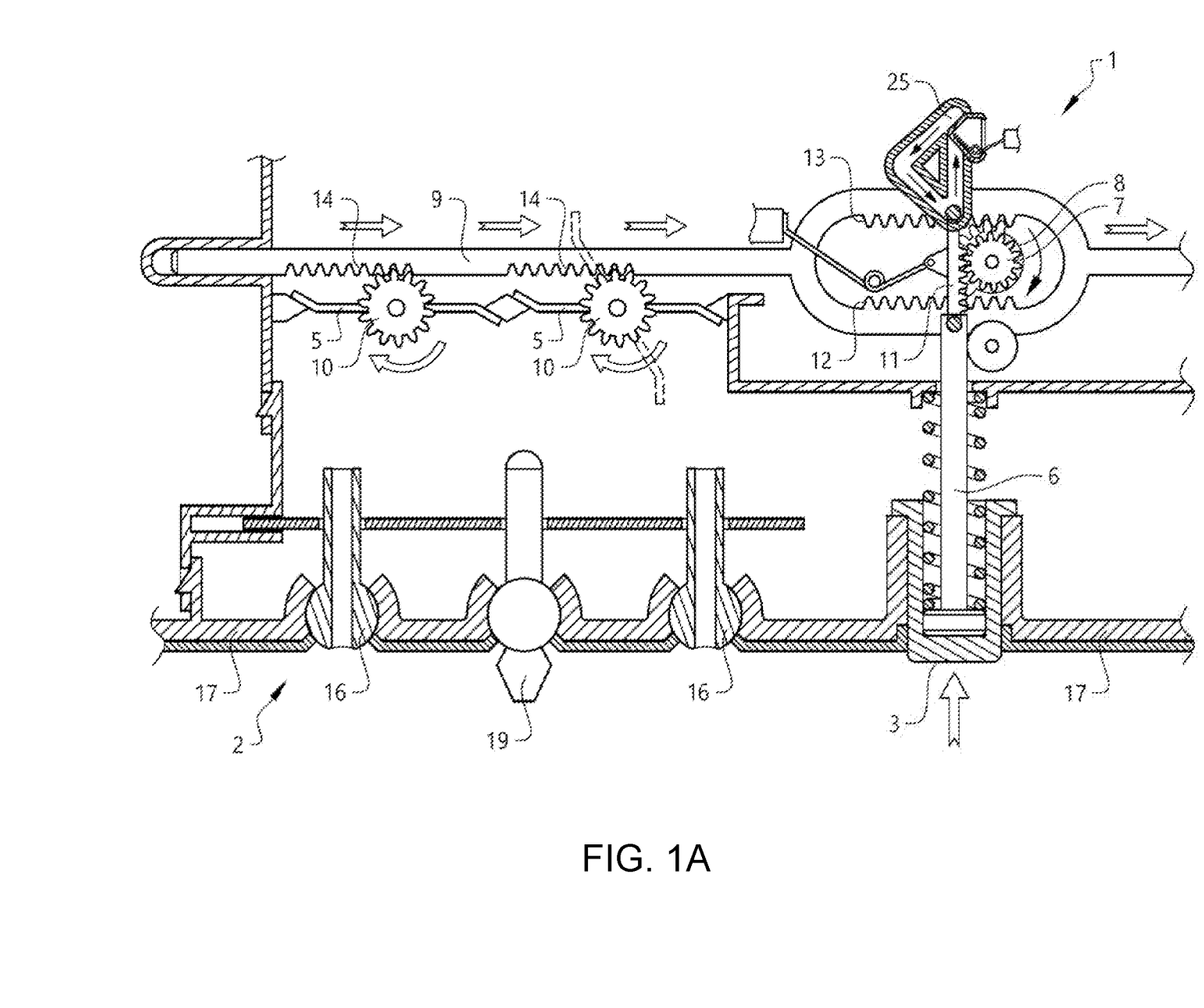
FIGS. 1A-1E show schematically, sectional views from above of an embodiment of an air nozzle control mechanism according to the disclosure.
Figure 1B:
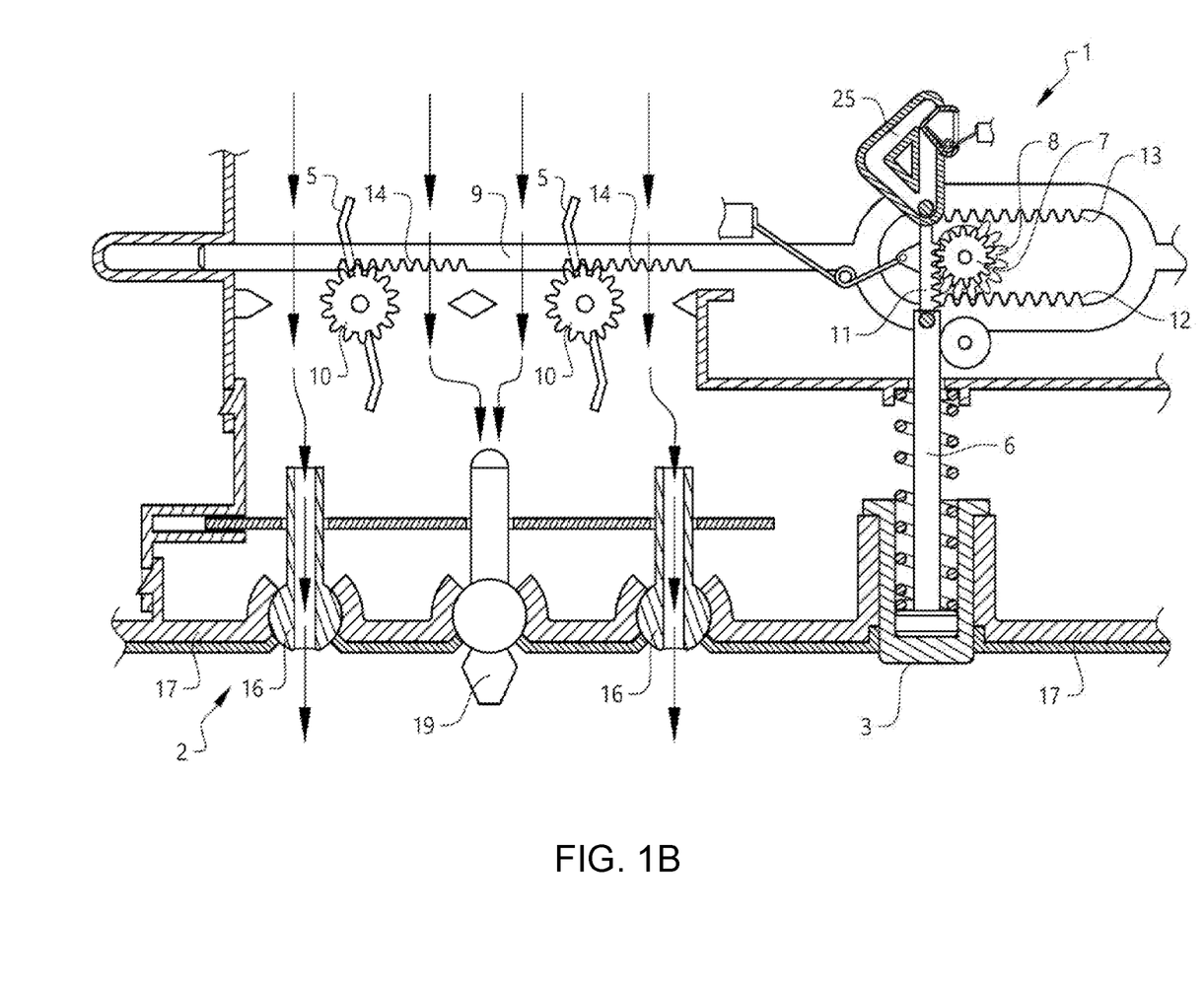

FIGS. 1A-1E schematically show sectional views from above of a user-actuated air nozzle control mechanism 1 according to the disclosure. The control mechanism 1 is controlling the air flow to an air nozzle device 2 in a vehicle, and comprises a push button 3, a mechanical actuating mechanism 4 connected to the push button 3, and at least one flow control valve 5 connected to the mechanical actuating mechanism 4. The at least one flow control valve 5 is configured to be displaced between an open position where air is flowing to the air nozzle device 2, as shown in FIG. 1B, and a closed position where air is prevented from flowing to the air nozzle device 2, as shown in FIG. 1A.

The push button 3 and the air nozzle device 2 may be integrated into an interior structure 17 of the vehicle, such as for example a dashboard, a door panel, a rear seat console or similar structure. The push button 3 is used for controlling the flow of air through the air nozzle device 2 into the interior compartment of the vehicle. A user of the vehicle, such as a driver or a passenger, can through pushing the push button 3 in actuating sequences switch between an operational mode of the air nozzle device 2, where air is prevented from flowing into the interior compartment through the air nozzle device 2, and an operational mode of the air nozzle device 2, where air is flowing into the interior compartment. Each operational mode of the air nozzle device 2 is thus preceded by an actuating sequence of the push button 3, which will be further described below. With the expression user-actuated air nozzle control mechanism 1 is meant that a user manually is actuating the at least one flow control valve 5 by manually actuating the push button 3.

The push button 3 may be designed so that it is manually actuated by the user through a pushing movement, for example by pushing the push button 3 with a fingertip. As can be seen in the figures, the push button 3 may be arranged in the interior structure 17 of the vehicle with a compression spring 23, for example a helical compression spring, which may exert a force on the push button 3. The push button 3 is actuated by manually applying pressure on the push button 3 so that it is translating from an initial position to an end position and at the end position releasing the pressure so that the push button 3 translates back to the initial position. When pushing the push button 3 from the initial position to the end position, the compression spring 23 is compressed and through spring action from the compression spring 23 the push button 3 may return from the end position to the initial position when the pressure is released.

Figure 1C:
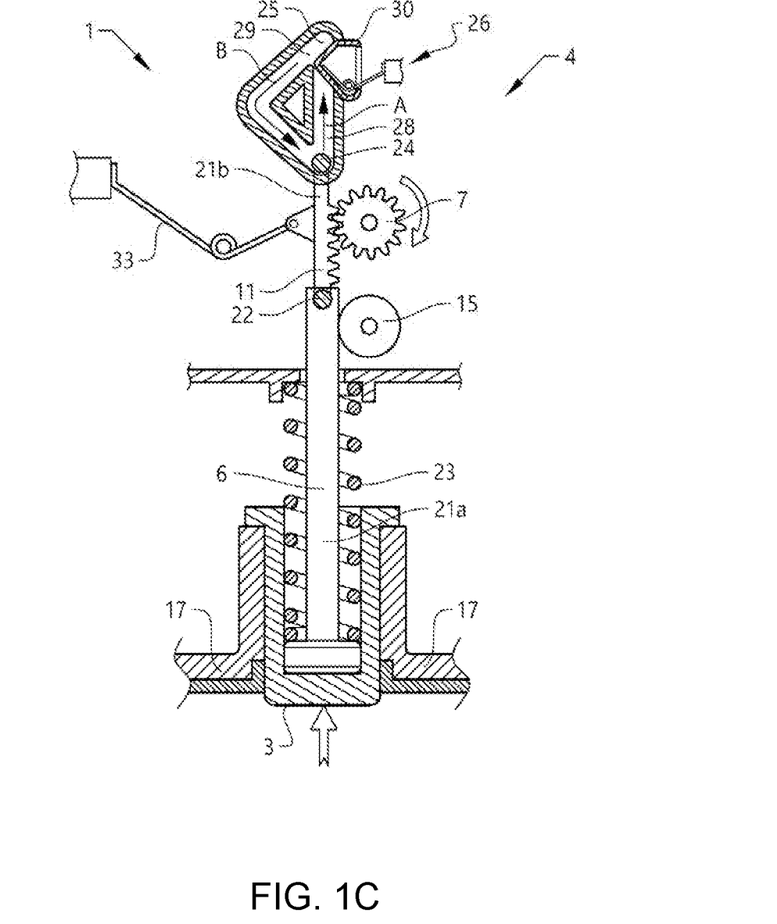

The push button 3 may be integrated into an interior structure 17 of the vehicle so that it is flush with the outer surface of the interior structure 17 in the initial position. The push button 3 may also be integrated within the interior structure 17 in other ways, and for example the push button 3 may extend out from the interior structure 17, as shown in FIG. 1C, or be located at a distance inside the interior panel 17.

The push button 3 described in conjunction with the drawings will have the initial position as the starting or resting position. This is thus the position of the push button 3 when not being actuated. When actuating the push button 3, the push button 3 is pushed in a direction into the interior structure 17 of the vehicle until the push button 3 reaches the end position. The end position may be a position where the push button 3 cannot be pushed any further. This may for example be achieved by any type of suitable stopping means that will delimit further movement of the push button 3 beyond the end position.

The push button 3 is in a first actuating sequence adapted to be translating from the initial position to the end position and back to the initial position. In this first actuating sequence, the mechanical actuating mechanism 4 is displacing the at least one flow control valve 5 from the open position to the closed position. The push button 3 is in a second actuating sequence adapted to be translating from the initial position to the end position and back to the initial position. In the second actuating sequence, the mechanical actuating mechanism 4 is displacing the at least one flow control valve 5 from the closed position to the open position. The push button 3 is thus in both the first and the second actuating sequences translating from the initial position to the end position and back to the initial position. In the first actuating sequence, the at least one flow control valve 5 is closed so that air is prevented from flowing to the air nozzle device 2. In the second actuating sequence, the at least one flow control valve 5 is opened so that air is flowing to the air nozzle device 2.

The first and the second actuating sequences are repeated after each other so that by actuating the push button a first time, the at least one flow control valve 5 is for example closed. When actuating the push button 3 a second time, the at least one flow control valve 5 is opened, and the third time the at least one flow control valve 5 is closed again. The closing and opening of the at least one flow control valve 5 will continue in a repeated manner between the first and second actuating sequences.

The mechanical actuating mechanism 4 may be designed so that the flow control valve 5 is displaced in the first actuating sequence and in the second actuating sequence when the push button 3 is translating from the initial position to the end position. In this way, the displacement of the at least one flow control valve 5 takes place, both for the first and the second actuating sequences, when the push button is moving from the initial position to the end position in a translational movement. When the push button 3 returns from the end position to the initial position, the at least one flow control valve 5 is not impacted by the return movement and stays in the position into which it already has been displaced, both for the first and the second actuating sequences.

As an alternative, the mechanical actuating mechanism 4 may be designed so that the flow control valve 5 is instead displaced in the first actuating sequence and in the second actuating sequence when the push button 3 is translating from the end position to the initial position. In this alternative, the at least one flow control valve 5 is not impacted by the movement of the push button 3, when the push button 3 moves from the initial position to the end position, both in the first and the second actuating sequences. The displacement of the at least one flow control valve 5 instead takes place, both for the first and the second actuating sequences, when the push button 3 is moving from the end position to the initial position in the returning translational movement.

In order to mechanically transfer the movement from the push button 3 to the flow control valve 5 when the push button 3 is being actuated, the mechanical actuating mechanism 4 is designed to establish the desired displacement of the flow control valve 5. The mechanical actuating mechanism 4 comprises a first actuator 6, a second actuator 9, and other interlinked or connected components that will be further described more in detail below.

As shown in FIGS. 1A, 1B and 1C, the first actuator 6 may be constructed as an elongated actuating mechanism, which is connected to the push button 3. The first actuator 6 comprises, in the shown embodiment, at least two connected linkage arms and at least one pivoting joint 22. In the embodiment shown in the figures, a first linkage arm 21a is at one end connected to the push button 3 and a second linkage arm 21b is connected to the first linkage arm 21a via the pivoting joint 22. The first linkage arm 21a and the second linkage arm are shaped as elongated rods. As described above, the first linkage arm 21a is at one end connected to the push button 3, and the other end is connected to one end of the second linkage arm 21b. The pivoting joint 22 is linking the first linkage arm 21a to the second linkage arm 21b, and may be of any suitable construction, such as a rivet, screw or similar device. The second linkage arm 21b is constructed so that it can pivot around the pivoting joint 22 in relation to the first linkage arm 21a.

The second linkage arm 21b may be provided with a first gear rack 11, which is designed to interact with a first pinion 7. In this way, the first pinion 7 is connected to the first actuator 6 so that when actuating the push button 3, the gears of the first gear rack 11 are interacting with the gears of the first pinion 7. In the embodiment shown in the figures, the gears of the first gear rack 11 engages the gears of the first pinion 7 when the push button 3 is translating from the initial position to the end position. In this way, the first pinion 7 will rotate when the push button 3 is translating from the initial position to the end position. Depending on the design of the air nozzle control mechanism, the rotation angle of the first pinion 7 when being rotated by the first gear rack may differ. As an example, the first pinion 7 may have a rotation angle of about 180° when rotated during translation of the push button 3 from the initial position to the end position. With a rotation angle of 180° in the first and the second actuating sequences respectively, the first pinion 7 will rotate one full revolution or 360° when the push button 3 has been actuated twice in the first and the second actuating sequences. Other suitable rotation angles are also possible depending on the design of the first pinion 7 and the first gear rack 11.

The first actuator 6, with the first linkage arm 21a and the second linkage arm 21b, may be made of any suitable material, such as metals, plastic materials, composite materials or combinations of different materials. The first gear rack 11 may be integrated in the second linkage arm 21b or arranged as separate part attached to the second linkage arm 21b. Also the first gear rack 11 may be made of any suitable material, such as metals, plastic materials, composite materials or combinations of different materials.

As shown in FIGS. 1A, 1B and 1C, the end of the second linkage arm 21b not connected to the first linkage arm 21a may be provided with a protrusion 24, which protrusion when viewed from above in the embodiment shown is pointing upwards from the second linkage arm 21b. The protrusion 24 is designed to cooperate with a track 25 formed as a groove arranged above the second linkage arm 21b, into which the protrusion 24 may extend and run when the push button 3 is actuated. As shown in the figures, the track 25 may be shaped as an endless loop when viewed from above. The track 25 may further be provided with a locking mechanism 26 allowing the protrusion 24 to follow the track in one direction only when the push button is actuated in the first and second actuating sequences respectively, as explained more in detail below. In alternative embodiments, the protrusion 24 and the track 25 may be arranged in other ways. The protrusion may as an example instead point downwards into a track arranged below the second linkage arm 21b.

Figure 3A:
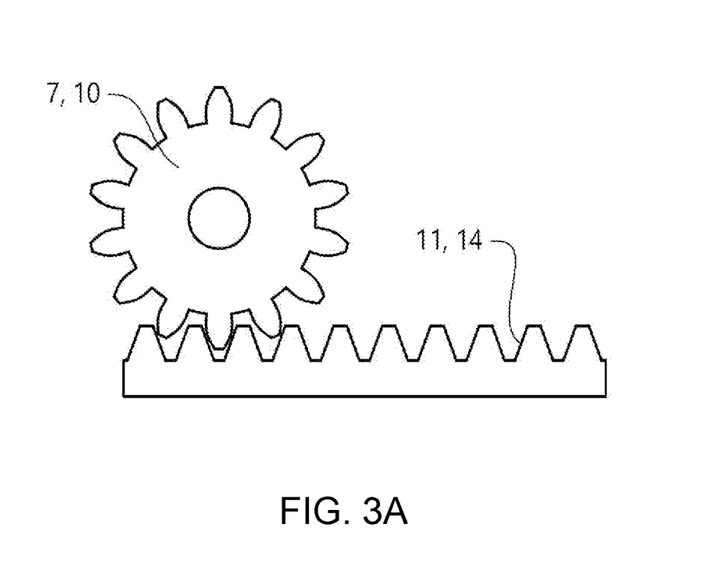
FIGS. 3A-3C show schematically, views of gear racks and pinions according to the disclosure.

The mechanical actuating mechanism 4 further comprises a second pinion 8, which is connected to the first pinion 7. According to the embodiment shown in the figures, the first pinion 7 and the second pinion 8 are fixedly connected to a common pinion shaft 27, so that when the first pinion 7 rotates a certain rotation angle also the second pinion 8 rotates in the same direction with the same rotation angle. The first pinion 7 is located at a distance from the second pinion 8 so that the pinion shaft 27 is arranged between the pinions, as shown in FIG. 3C.

The first pinion 7 and the second pinion 8 may be made of any suitable material, such as metals, plastic materials, composite materials or combinations of different materials.

When actuating the push button 3, the translating movement of the push button 3 is transferred into a first linear motion of the first actuator 6 so that the first linkage arm 21a and the second linkage arm 21b are translating in the same direction as the push button 3. As shown in FIGS. 1A, 1B and 1C, the initial part of the track 25 extends in a straight path 28 in the pushing direction of the push button 3, and the rest of the track 25 loops back in a curved path 29. When the push button 3 translates from the initial position to the end position, the first linkage arm 21a and the second linkage arm 21b translates with the push button 3 in the same direction and the protrusion 24 of the second linkage arm secures that the second linkage arm 21b is following the track 25 in the desired direction. When the push button 3 is translating from the initial position to the end position, the protrusion 24 is following the track 25 in the straight path 28 from the initial position to the end position, and when the push button 3 reaches the end position, the protrusion is activating the locking mechanism 26. The second linkage arm 21b may be provided with a suitable spring means, such as a torsion spring 33 as shown in FIG. 1C, so that the torsion spring 33 forces the protrusion 24 to follow the straight path 28 from the initial position to the end position.

The locking mechanism 26 is designed so that the protrusion 24 is prevented from following the straight path 28 of the track 25 when the push button 3 is translating from the end position back to the initial position. The locking mechanism 26 secures that the protrusion 24 is instead following the track 25 in the curved path 29 back to the initial position. The locking mechanism may be constructed in any suitable way. In the embodiment shown in the drawings, the locking mechanism 26 comprises a spring actuated latch 30 that is pushed away by the protrusion 24 and is preventing the return movement of the protrusion along the straight path 28 and instead forces the protrusion 24 to follow the curved path 29 when the push button 3 is translating from the end position to the initial position.

When the push button 3 is translating from the initial position to the end position, the first gear rack 11 arranged on the second linkage arm 21b is engaging the first pinion 7 so that the first pinion 7 rotates. In this way, the first linear motion of the first actuator 6 is transferred into a rotating motion of the first pinion 7 and the second pinion 8. This may be accomplished by the protrusion 24, which is following the straight path 28 of the track 25. When the push button 3 is translating from the end position to the initial position, the protrusion 24 is following the curved path 29. In this way, the second linkage arm 21b with the first gear rack 11 will pivot around the pivoting joint 22 so that the first gear rack 11 is disengaged from the first pinion 7. The first pinion 7 will thus not rotate when the push button 3 is translating from the end position to the initial position. With this construction, the first pinion 7 and the second pinion 8 are rotating in one direction only when the push button 3 is actuated in the first and the second actuating sequences.

In another alternative embodiment not shown in the figures, the control mechanism 1 is designed so that the at least one flow control valve 5 is displaced when the push button 3 is translating from the end position to the initial position. The first gear rack 11 is in this embodiment adapted to be disengaged from the first pinion 7 when the push button 3 is translating from the initial position to the end position. This may be accomplished by the protrusion 24, which instead is following the curved path 29 of the track 25 from the initial position to the end position. When the push button 3 is translating from the end position to the initial position, the protrusion 24 is instead following the straight path 28 so that the first gear rack 11 engages the first pinion 7.

Figure 1D:
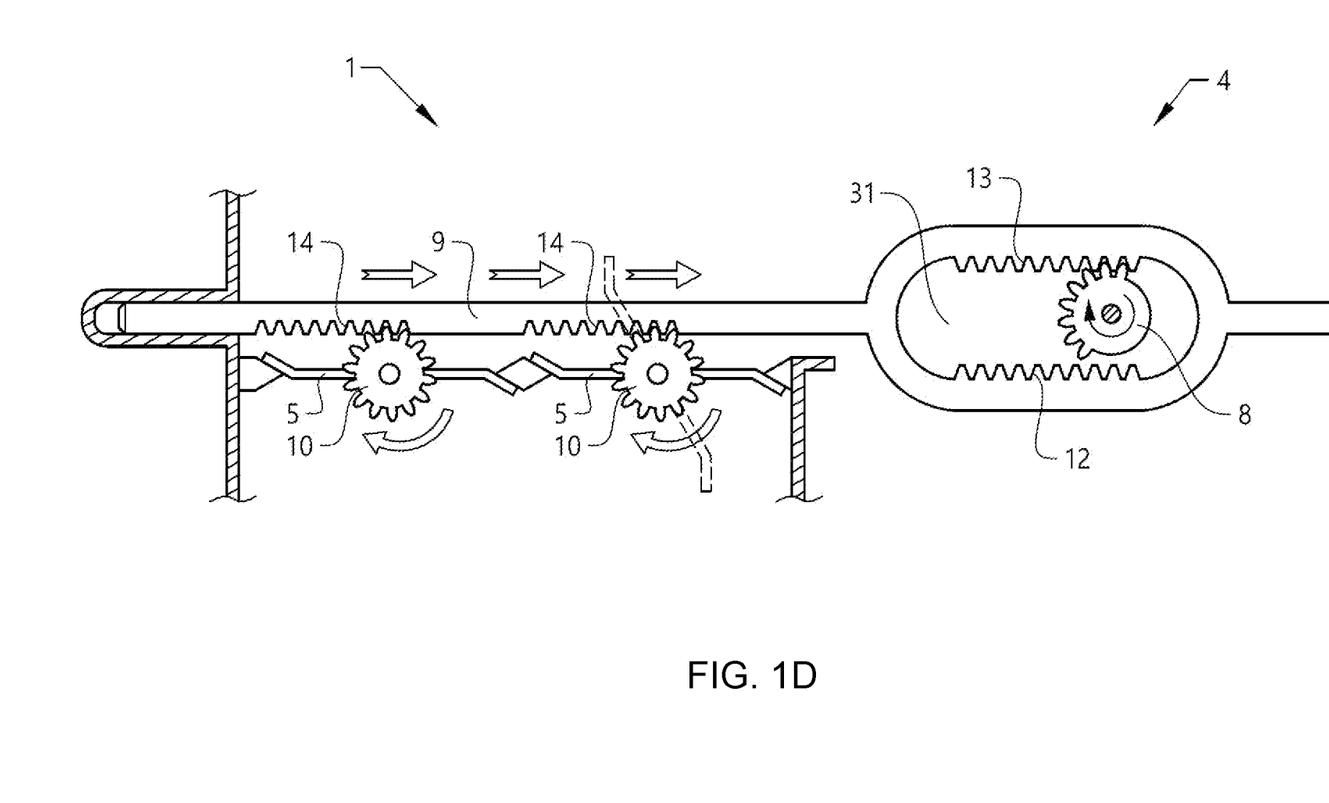

As shown in FIGS. 1A, 1B and 1D, the second pinion 8 is connected to the second actuator 9. The mechanical actuating mechanism 4 further comprises at least one third pinion 10, which is attached to the at least one flow control valve 5 connected to the second actuator 9. In the embodiment shown in the figures, two third pinions 10 are each connected to two flow control valves 5. However, it is also possible to have only one third pinion 10 and one flow control valve 5 or to have more than two third pinions 10 and flow control valves 5.

The flow control valve 5 may be of any suitable type, such as an air shutter valve, with a valve flap or panel that can rotate around an axis. The axis is connected to the third pinion 10 so that the translational movement of the second actuator 9 can be transferred to a rotational movement of the flow control valve 5.

The second actuator 9 may be arranged as a bar with an elongated shape, and is provided with a section having a gear rack opening 31. In the embodiment shown in the figures, the gear rack opening 31 has an elongated shape with rounded edges, but other suitable shapes are also possible. The gear rack opening 31 is arranged to house gear racks that are engaging the second pinion 8. The second actuator 9 comprises, in the shown embodiment, a second gear rack 12 and a third gear rack 13, which both are arranged to engage the second pinion 8 so that the rotational motion of the second pinion 8 is transferred into a reciprocating linear motion of the second actuator 9. In this way, the first linear motion of the first actuator 6 is transferred into a second linear motion of the second actuator 9 via the first pinion 7 and the second pinion 8. The third gear rack 13 is oppositely arranged the second gear rack 12 within the gear rack opening 31, as shown in the figures, so that the rotating motion of the second pinion 8 is transferred into the second linear motion of the second actuator 9. As shown in FIGS. 1A, 1B and 1D, the second pinion 8 is arranged between the second gear rack 12 and the third gear rack 13.

Figure 3B:
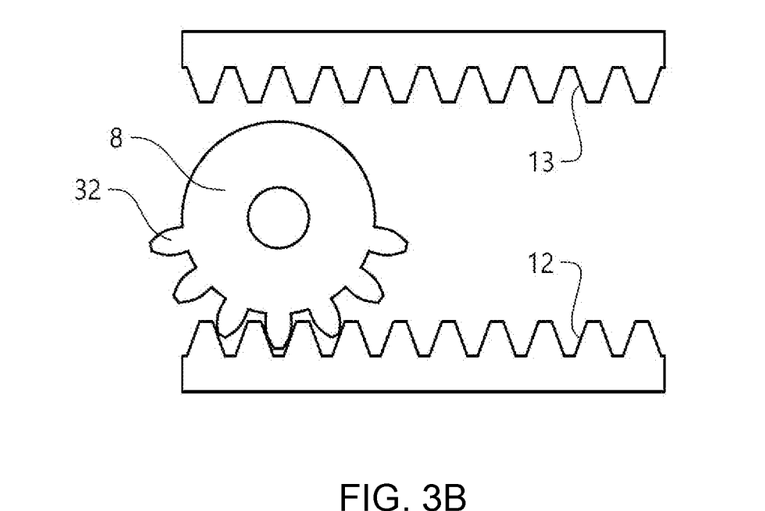
Figure 3C:
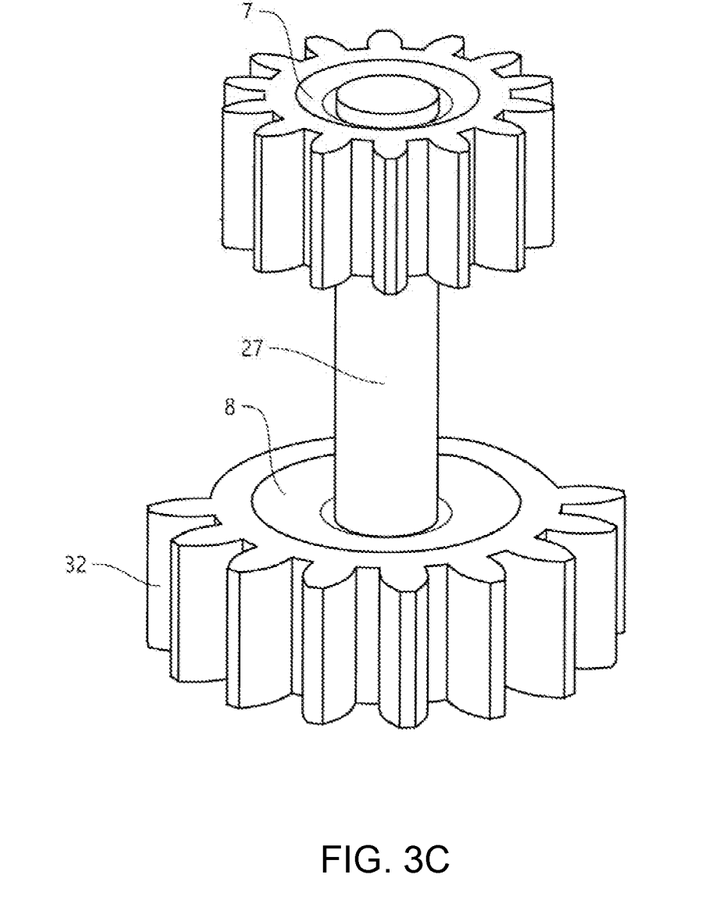

To achieve the reciprocating linear motion of the second actuator 9, the second pinion 8 is only partially toothed, and provided with a toothed part 32 that is not extending around the whole periphery of the second pinion 8, as shown in FIGS. 3B and 3C. The second pinion 8 may be constructed as an intermittent gear or a mutilated gear, where the non-toothed part is not interacting with the gear racks. The second gear rack 12 and the third gear rack 13 are engaged in an alternating manner in the first actuating sequence and the second actuating sequence respectively. The partially toothed part 32 of the second pinion 8 is designed so that only one of the second gear rack 12 and the third gear rack 13 is engaged when the second pinion 8 is rotating. In this way, the rotational motion of the second pinion is transferred into a reciprocating linear motion of the second actuator 9, by means of the mutilated second pinion 8, which alternatingly drives the first gear rack 12 and the second gear rack 13. The second pinion 8 may have a generally circular shape with the toothed part 32 arranged along a part of the outer periphery of the second pinion 8. The second pinion 8 may also have other suitable shapes, such as a triangular-like shape with a toothed circular segment or a semi-circular shape with a partially toothed part. Since the second pinion 8 only rotates in one direction, the second linear motion of the second actuator 9 will be a reciprocating motion. When the second pinion 8 engages the second gear rack 12, the second actuator 9 moves in one direction and when the second pinion engages the third gear rack 13, the second actuator 9 moves in the opposite direction.

The second actuator 9 may be made of any suitable material, such as metals, plastic materials, composite materials or combinations of different materials. The second gear rack 12 and the third gear rack 13 may be integrated in the second actuator 9 or arranged as separate parts attached to the second actuator 9. Also the second gear rack 12 and the third gear rack 13 may be made of any suitable material, such as metals, plastic materials, composite materials or combinations of different materials.

The second actuator 9 may further comprise at least one fourth gear rack 14 engaging the at least one third pinion 10, so that the second linear motion of the second actuator 9 is transferred into a rotating motion of the third pinion 10. Through the arrangement where the second gear rack 12 and the third gear rack 13 are alternatingly engaging the partially toothed second pinion 8, the third pinion 10 has a rotating motion in one direction when the at least one flow control valve 5 is displaced from the open position to the closed position, and a rotating motion in an opposite direction when the at least one flow control valve 5 is displaced from the closed position to the open position. The flow control valve 5 is thus configured to be rotatably displaced between the open position where air is flowing to the air nozzle device 2 and the closed position where air is prevented from flowing to the air nozzle device 2. The fourth gear rack 14 may be integrated in the second actuator 9 or arranged as a separate part attached to the second actuator 9. The fourth gear rack 14 may be made of any suitable material, such as metals, plastic materials, composite materials or combinations of different materials. The gear racks 12, 13, 14 may be of any suitable type, and as schematically shown in FIGS. 3A and 3B they may have an extended shape with a toothed side that is interacting with the respective pinions. Also, the third pinion 10 may be made of any suitable material, such as metals, plastic materials, composite materials or combinations of different materials. The pinions are designed to interact with the gear racks, see FIGS. 3A and 3B, and may be of any conventional type with a suitable toothed profile matching the toothed profile of the gear racks. The first pinion 7 and the third pinion 10 may be made as a round gear as schematically shown in FIGS. 3A and 3C. The second pinion 8 may as described above have a generally circular shape with the toothed part 32 arranged along a part of the outer periphery, see FIGS. 3B and 3C.

In the embodiment shown in FIG. 1A, the first actuator 6 and the second actuator 9 are operating and moving in different essentially parallel planes in relation to each other. In this embodiment, the first actuator 6 is positioned in a plane above the second actuator 9, which may be a suitable configuration when for example integrating the air nozzle control mechanism 1 in the dashboard of a car. Other arrangements are also possible within the scope of the disclosure. The first pinion 7 is operating in the same plane as the first actuator 6 and the second pinion 8 is together with the third pinion 10 acting in the same plane as the second actuator 9. It is also possible to arrange the first and second actuators with other shapes than rod-shaped. As an alternative embodiment, it may also be possible to arrange the first actuator 6 so that it instead is positioned in a plane below the second actuator 9 with the same function. The first pinion 7 would then be arranged below the second pinion 8. Other options are also possible within the scope of the disclosure depending on where the air nozzle control mechanism 1 is integrated in the vehicle. The control mechanism 1 with the first actuator 6 and the second actuator 9 may be arranged in any suitable angle, plane or direction within the vehicle as long as the function described is achieved. If desired, the first actuator 6 and the second actuator 9 may also be constructed to operate and move in non-parallel planes if suitable pinion and gear rack components are used.

With reference to FIG. 1A, when actuating the push button 3 manually from the initial position to the end position, the first actuator 6 will translate in a first linear motion as described above so that the first pinion 7 is rotating in a clockwise direction. The second pinion 8 will then also rotate in a clockwise direction since it is connected to the first pinion 7 via the pinion shaft 27. The second pinion 8 will depending on the actuating sequence engage one of the second gear rack 12 and the third gear rack 13 so that the second actuator 9 will be translated into a second linear motion. In the position shown in FIG. 1A, the second pinion 8 will engage the third gear rack 13 so that the second actuator 9 will move to the right in order to rotate the two third pinions 10 in a clockwise direction in order to displace the flow control valves 5 from the closed position to the open position, which open position is shown in FIG. 1B. When the push button 3 is returning to the initial position, the first gear rack 11 is disengaged from the first pinion 7 so that the flow control valves 5 will remain in the open position. This is the second actuating sequence as described above.

When the flow control valves 5 are in the open position and the push button 3 is being manually actuated, from the initial position to the end position, the first actuator 6 will translate in a first linear motion as described above so that the first pinion 7 is rotating in a clockwise direction. The second pinion 8 will then also rotate in a clockwise direction since it is connected to the first pinion 7 via the pinion shaft 27. The second pinion 8 will now engage the second gear rack 12 so that the second actuator 9 will move to the left in order to rotate the two third pinions 10 in a counter-clockwise direction in order to displace the flow control valves 5 from the open position to the closed position. When the push button 3 is returning to the initial position, the first gear rack 11 is disengaged from the first pinion 7 so that the flow control valves 5 will remain in the closed position, as shown in FIG. 1A. This is the second actuating sequence as described above.

The first actuator 6 and the second actuator 9 may be arranged at an angle in relation to each other, see FIG. 1A. In this way, the direction of the first linear motion is arranged at an angle to the direction of the second linear motion. The angle between the first actuator 6 and the second actuator 9 may be chosen to suit the specific construction of the user-actuated air nozzle control mechanism. In FIG. 1A, the angle between the first actuator 6 and the second actuator 9 is about 90°, but other suitable angles are also possible depending on the design.

The first actuator 6 may be connected to a damping unit 15, which is adapted for dampening the translational movement of the push button 3. The damping unit 15 may be of any suitable type, such as for example a rotational or rotary oil damper. The damping unit 15 may be provided with a pinion, which as an example is engaging a gear rack or other suitable means provided on the first actuator 6. Other constructions are also possible as long as the translational movement of the push button 3 is dampened.

Figure 2:
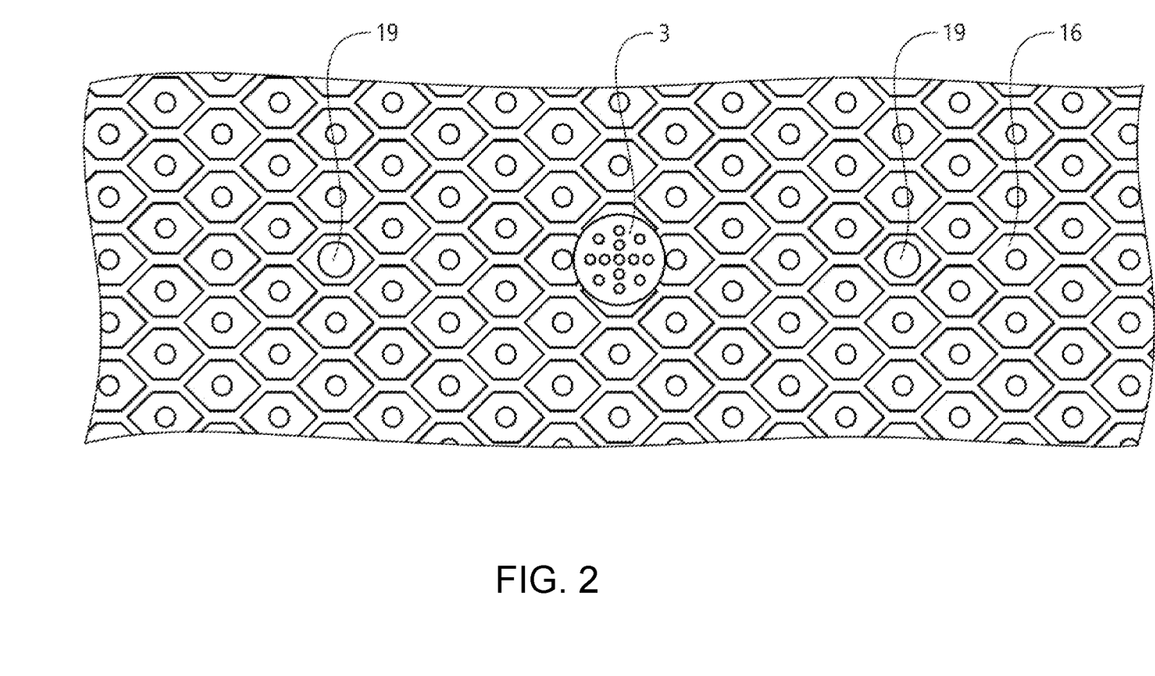
FIG. 2 shows schematically, an interior structure of a vehicle with an air nozzle control mechanism according to the disclosure.

As described above, the air nozzle device 2 and the push button 3 may be integrated in the interior structure 17 of the vehicle, as shown in FIG. 2. The air nozzle device 2 comprises one or more air nozzle units 16 that may be integrated in the interior structure 17. In the embodiment shown in the figure, the air nozzle device 2 comprises a plurality of air nozzle units 16, which are arranged in a grid shaped pattern. The air nozzle units 16 may be also be arranged in other ways with different patterns depending on the design of the vehicle and interior structure. The air nozzle units 16 are provided with an air flow channel through which air can flow into the interior compartment of the vehicle, as shown in FIG. 1B. In order to control the direction of air flow out from the air nozzle device, at least one of the air nozzle units 16 is pivotably arranged within the interior structure 17. In this way, the air flow out from the at least one pivotably arranged air nozzle unit 16 can be directed in different directions with an air flow directing arrangement 18.

In the embodiment shown in FIGS. 1A, 1B, 1E and 2, the air flow directing arrangement 18 comprises an air flow directing element 19 pivotably arranged within the interior structure 17 and a connection member 20 connecting the air flow directing element 19 and the at least one pivotably arranged air nozzle unit 16. With this construction, when adjusting the direction of the air flow directing element 19 the direction of the air flow out from the at least one pivotably arranged air nozzle unit 16 is adjusted. It is possible to arrange one or more air flow directing arrangements 18 for each user-actuated air nozzle control mechanism 1, and as shown in FIG. 2, two air flow directing arrangements 18 are provided in the interior structure 17 of the vehicle.

Figure 1E:
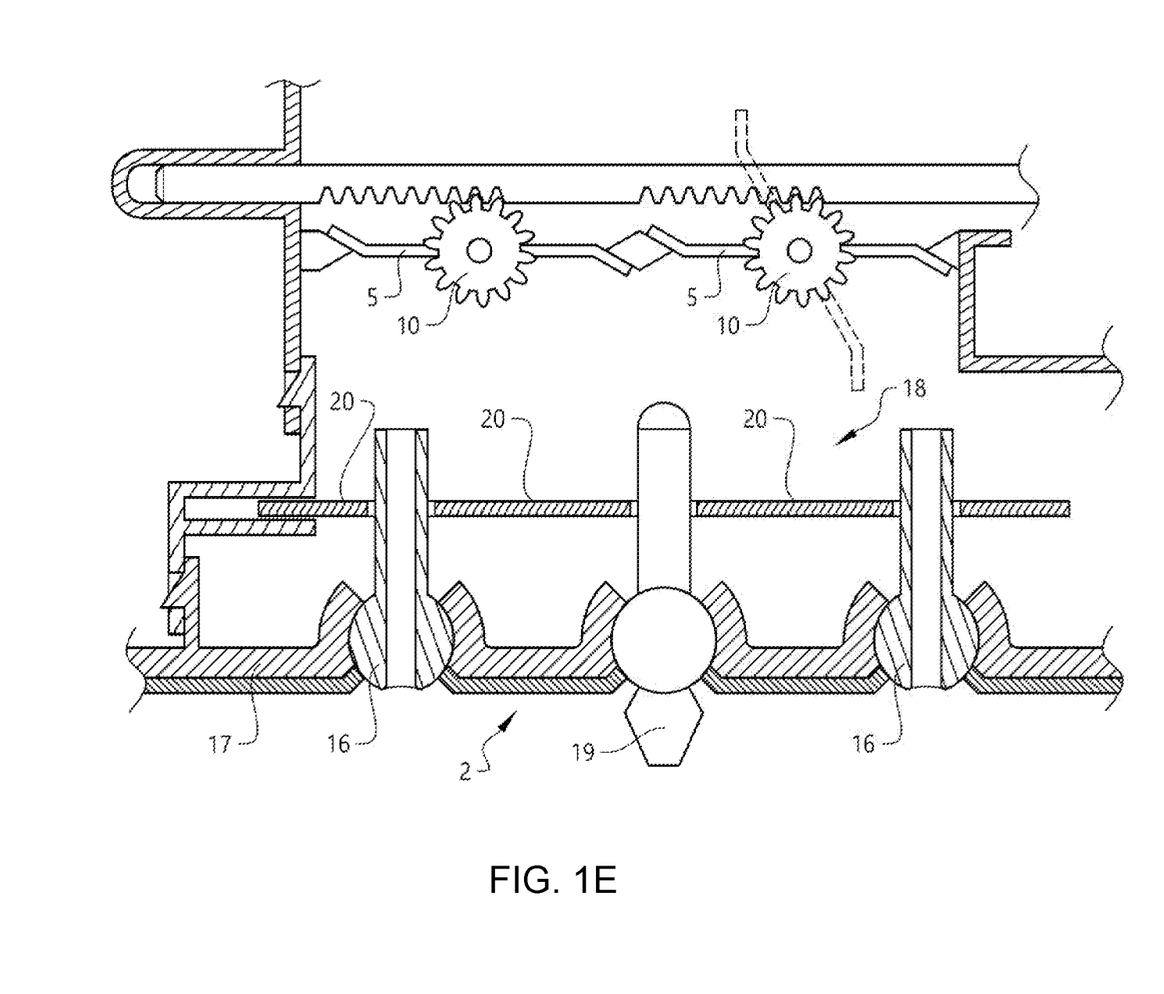

As shown in FIGS. 1A and 1E, the air flow directing element 19 may be designed with a knob extending out from the interior structure of the vehicle into the interior compartment. The driver or passengers of the vehicle can use the knob to steer the direction of air flow from the air nozzle units 16. The air flow directing element 19 further has an inwardly extending rod-like part connected to the connection member 20. The air nozzle units 16 also have inwardly extending rod-like parts, which also are connected to the connection member 20. The connection member 20 may be constructed as a rod or plate, which is connecting or interlinking the air flow directing element 19 and the air nozzle units 16, so that when adjusting the direction of the air flow directing element 19 with the knob, the direction of the air nozzle units 16 are also adjusted.

One or more user-actuated air nozzle control mechanisms 1 may be provided in the vehicle. The components of the user-actuated air nozzle control mechanism 1 are arranged in the interior structure 17 of the vehicle with suitable bearing or holding means.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Control mechanism
2: Air nozzle device
3: Push button
4: Mechanical actuating mechanism Flow control valve
5: First actuator
6: First pinion
7: Second pinion
8: Second actuator
9: Third pinion
10: First gear rack
11: Second gear rack
12: Third gear rack
14: Fourth gear rack
15: Damping unit
16: Air nozzle unit
17: Interior structure
18: Air flow directing arrangement
19: Air flow directing element
20: Connection member
21a: First linkage arm
21b: Second linkage arm
22: Pivoting joint
23: Compression spring 24: Protrusion
25: Track
26: Locking mechanism
27: Pinion shaft
28: Straight path
29: Curved path
30: Latch
31: Gear rack opening
32: Toothed part
33: Torsion spring

The invention claimed is:

1. A user-actuated air nozzle control mechanism for controlling air flow to an air nozzle in a vehicle, comprising a push button, a mechanical actuating mechanism connected to the push button, and at least one flow control valve connected to the mechanical actuating mechanism, wherein the at least one flow control valve is configured to be displaced between an open position in which air flows to the air nozzle and a closed position where air is prevented from flowing to the air nozzle,
wherein the push button, in a first actuating sequence, translates from an initial position to an end position and back to the initial position, so that the mechanical actuating mechanism displaces the at least one flow control valve from the open position to the closed position, and
wherein the push button, in a second actuating sequence, translates from the initial position to the end position and back to the initial position, so that the mechanical actuating mechanism displaces the at least one flow control valve from the closed position to the open position,
wherein the mechanical actuating mechanism comprises a first actuator connected to the push button, a first pinion connected to the first actuator, a second pinion connected to the first pinion, a second actuator connected to the second pinion, and at least one third pinion attached to the at least one flow control valve, wherein the at least one third pinion is connected to the second actuator,
wherein the translating movement of the push button is transferred into a first linear motion of the first actuator, the first linear motion of the first actuator is transferred into a rotating motion of the first pinion and the second pinion, the rotating motion of the first pinion and the second pinion is transferred into a second linear motion of the second actuator, and the second linear motion of the second actuator is transferred into a rotating motion of the at least one third pinion; wherein each of the first and second actuating sequences is accomplished by manually applying pressure on the push button so that it is translated from the initial position to the end position, and at the end position re leasing the pressure so that the push button translates back to the initial position.

2. The user-actuated air nozzle control mechanism according to claim 1,
wherein the first actuator comprises a first gear rack engaging the first pinion.

3. The user-actuated air nozzle control mechanism according to claim 2,
wherein the first pinion and the second pinion rotate in one direction only, wherein the first gear rack disengages from the first pinion during a portion of the translation of the push button.

4. The user-actuated air nozzle control mechanism according to claim 1,
wherein the first actuator comprises at least two linkage arms and at least one pivoting joint.

5. The user-actuated air nozzle control mechanism according to claim 1,
wherein the second actuator comprises a second gear rack and a third gear rack configured to engage the second pinion, wherein the third gear rack is oppositely arranged from the second gear rack, wherein the rotating motion of the second pinion is transferred to the second actuator so that the second linear motion is a reciprocating motion.

6. The user-actuated air nozzle control mechanism according to claim 5,
wherein the second pinion is partially toothed so that the second gear rack and the third gear rack are alternatingly engaged in the first actuating sequence and the second actuating sequence, respectively.

7. The user-actuated air nozzle control mechanism according to claim 1,
wherein the second actuator comprises at least one fourth gear rack configured to engage the at least one third pinion, wherein the at least one third pinion has a rotating motion in one direction when the at least one flow control valve is displaced from the open position to the closed position and has a rotating motion in an opposite direction when the at least one flow control valve is displaced from the closed position to the open position.

8. The user-actuated air nozzle control mechanism according to claim 1,
wherein the direction of the first linear motion is arranged at an angle to the direction of the second linear motion.

9. The user-actuated air nozzle control mechanism according to claim 1,
wherein the first actuator is connected to a damping unit that dampens, translational movement of the push button.

10. The user-actuated air nozzle control mechanism according to claim 1,
wherein the at least one flow control valve is configured to be rotatably displaced between the open position and closed positions.

11. The user-actuated air nozzle control mechanism according to claim 1,
wherein the air nozzle and the push button are integrated in an interior structure of the vehicle, wherein the air nozzle comprises one or more air nozzle units.

12. The user-actuated air nozzle control mechanism according to claim 11,
wherein at least one of the air nozzle units is pivotably arranged within the interior structure so that the air flow out of the at least one pivotably arranged air nozzle unit is configured to be directed in different directions with an air flow directing arrangement, wherein the air flow directing arrangement comprises an air flow directing element pivotably arranged within the interior structure and a connection member connecting the air flow directing element and the at least one pivotably arranged air nozzle unit, so that when adjusting the direction of the air flow directing element the direction of the air flow out from the at least one pivotably arranged air nozzle unit is adjusted.

13. The user-actuated air nozzle control mechanism according to claim 1, wherein the at least one flow control valve is displaced in the first actuating sequence and in the second actuating sequence when the push button is translating from the initial position to the end position.

\* \* \* \* \*